United States Patent
Ronan (10) Patent No.: US 9,133,555 B2
(45) Date of Patent: Sep. 15, 2015

(54) ELECTROLYTIC CELL STACK WITH PROTON EXCHANGE MEMBRANE INTERLOCK SEALING GASKET

(75) Inventor: John J. Ronan, Kensington, NH (US)

(73) Assignee: Parker-Hannifin Corporation, Cleveland, OH (US)

( * ) Notice: Subject to any disclaimer, the term of this patent is extended or adjusted under 35 U.S.C. 154(b) by 368 days.

(21) Appl. No.: 12/993,935

(22) PCT Filed: Sep. 5, 2008

(86) PCT No.: PCT/US2008/075414
§ 371 (c)(1),
(2), (4) Date: Nov. 22, 2010

(87) PCT Pub. No.: WO2009/142653
PCT Pub. Date: Nov. 26, 2009

(65) Prior Publication Data
US 2011/0083959 A1    Apr. 14, 2011

Related U.S. Application Data

(60) Provisional application No. 61/055,419, filed on May 22, 2008.

(51) Int. Cl.
*C25B 9/06* (2006.01)
*C25B 9/18* (2006.01)
(Continued)

(52) U.S. Cl.
CPC ............... *C25B 9/10* (2013.01); *H01M 8/0273* (2013.01); *H01M 8/0284* (2013.01)

(58) Field of Classification Search
CPC ............ C25B 9/06; C25B 9/18; H01M 8/02; H01M 8/24

USPC .................................................. 204/242, 253
See application file for complete search history.

(56) References Cited

U.S. PATENT DOCUMENTS

| 4,175,025 A | 11/1979 | Creamer et al. |
| 5,037,518 A | 8/1991 | Young et al. |

(Continued)

FOREIGN PATENT DOCUMENTS

WO    02/27847    4/2002

OTHER PUBLICATIONS

International Search Report and Written Opinion of corresponding International Application No. PCT/US2008/075414, dated Dec. 16, 2008.

(Continued)

*Primary Examiner* — Zulmariam Mendez
(74) *Attorney, Agent, or Firm* — Renner, Otto, Boisselle & Sklar, LLP (57) ABSTRACT

An electrolytic cell employs a plastic molded frame component with raised ridges on one surface to create seal with a proton exchange membrane and on the opposite surface a groove with an interlocking feature for accepting a tabbed elastomer gasket. The gasket and frame design when combined with a proton exchange membrane can be stacked in multiple layers using mechanical hardware. The frame captures the softer elastomeric sealing material preventing elastomeric creep and loss of positive seal caused by the relaxation of mechanical hardware under load and internal pressure fluctuations. The addition of the ridged sealing surface provides positive surface contact with the polymeric membrane to further prevent the loss of seal under mechanical load. The interlocking feature reduces assembly time and improves assembly accuracy.

14 Claims, 8 Drawing Sheets

(51) Int. Cl.
*H01M 8/02* (2006.01)
*H01M 8/24* (2006.01)
*C25B 9/10* (2006.01)

(56) References Cited

U.S. PATENT DOCUMENTS

| | | | | |
|---|---|---|---|---|
| 5,480,743 | A | * | 1/1996 | McCarter et al. ............... 429/96 |
| 6,117,287 | A | * | 9/2000 | Molter et al. ................. 204/255 |
| 6,685,821 | B2 | * | 2/2004 | Kosek et al. .................. 205/637 |
| 6,811,915 | B2 | * | 11/2004 | Dristy et al. .................. 429/510 |
| 6,852,205 | B1 | * | 2/2005 | Toyoshima et al. ........... 204/288 |
| 6,855,450 | B2 | | 2/2005 | Molter et al. |
| 7,001,687 | B1 | | 2/2006 | Gaines et al. |
| 7,014,947 | B2 | * | 3/2006 | Speranza et al. .............. 429/130 |
| 7,314,509 | B2 | | 1/2008 | Speranza et al. |
| 2004/0159543 | A1 | | 8/2004 | Boyer et al. |
| 2006/0269808 | A1 | | 11/2006 | Merlo et al. |

OTHER PUBLICATIONS

International Preliminary Report on Patentability of corresponding International Application No. PCT/US2008/075414, dated Aug. 19, 2010.

* cited by examiner

ELECTROLYTIC CELL STACK WITH PROTON EXCHANGE MEMBRANE INTERLOCK SEALING GASKET

PRIORITY

This application is a national phase of International Application No. PCT/US2008/075414 filed Sep. 9, 2008 and published in the English language, which claims priority of U.S. Provisional Application No. 61/055,419 filed May 22, 2008, which are hereby incorporated herein by reference.

FIELD OF THE INVENTION

The invention herein described relates generally to electrolytic cell stacks and more particularly to electrolytic cell stacks used to generate hydrogen and oxygen by the electrolytic dissociation of water, or as a fuel cell that produces electricity by converting hydrogen and oxygen back into water.

BACKGROUND

Gases, such as oxygen, hydrogen or chlorine, may be generated by disassociating a chemical compound into its constituent elements. Electrolytic cell stacks heretofore have been used for this purpose. The cell stack may include a catalytic anode, a catalytic cathode and an adjacent solid polymeric ion-exchange membrane as an electrolyte that is in electrical contact with both the anode and the cathode. A DC voltage is applied across the catalytic electrodes to cause the feed compound, such as water, to dissociate into its constituent ionic forms, such as oxygen and hydrogen. The evolved gas or gasses may be collected as desired.

U.S. Pat. No. 5,037,518, which is hereby incorporated herein by reference, discloses an electrolytic cell, also herein referred to as a cell stack. The cell has a watertight housing which clamps a solid polymeric ion-exchange membrane electrolyte between a catalytic cathode and a catalytic anode. Gaskets are provided to insure a water-tight construction for the electrolytic cell. The gaskets may be laminates having a catalytic screen disposed between two non-conductive annular gaskets. The screen is in electrical contact with the adjacent electrode and functions as a part of that electrode. To ensure that the screens firmly engage the respective electrodes, as well as the solid-electrolyte membrane, a pressure disc of the same diameter as the screens is disposed between the cathode and the uppermost gasket so that when the two housing sections are drawn together, the pressure disc exerts pressure on the screens.

SUMMARY OF THE INVENTION

Figure 2:
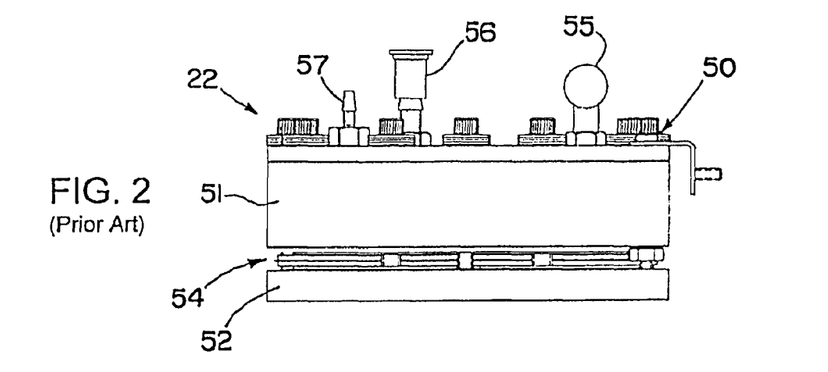
FIG. 2 is side elevational view of a prior art electrolytic cell stack assembly.

The arrangement shown in FIG. 2 of U.S. Pat. No. 5,037,518 works well for stacks with one or two cell layers. When more than two cell layers are used, pressure leakage problems have been found to occur, such as hydrogen leaking into the oxygen and outboard gas leakage to the atmosphere. In a prior art four layer cell stack using cells similar to the single cell shown in FIG. 2 of U.S. Pat. No. 5,037,518, the oxygen and hydrogen gaskets (gaskets 106 and 109 in U.S. Pat. No. 5,037,518 were replaced with gaskets made from an elastomeric material. This design has performed acceptably, but the inventors found that over time the elastomeric gaskets "relax". This relaxation can cause the cell stack to leak outboard and/or hydrogen to leak into the oxygen. The relaxation may also cause the screens to be driven into the ion-exchange membranes and this can lead to holes or tears.

Figure 3:
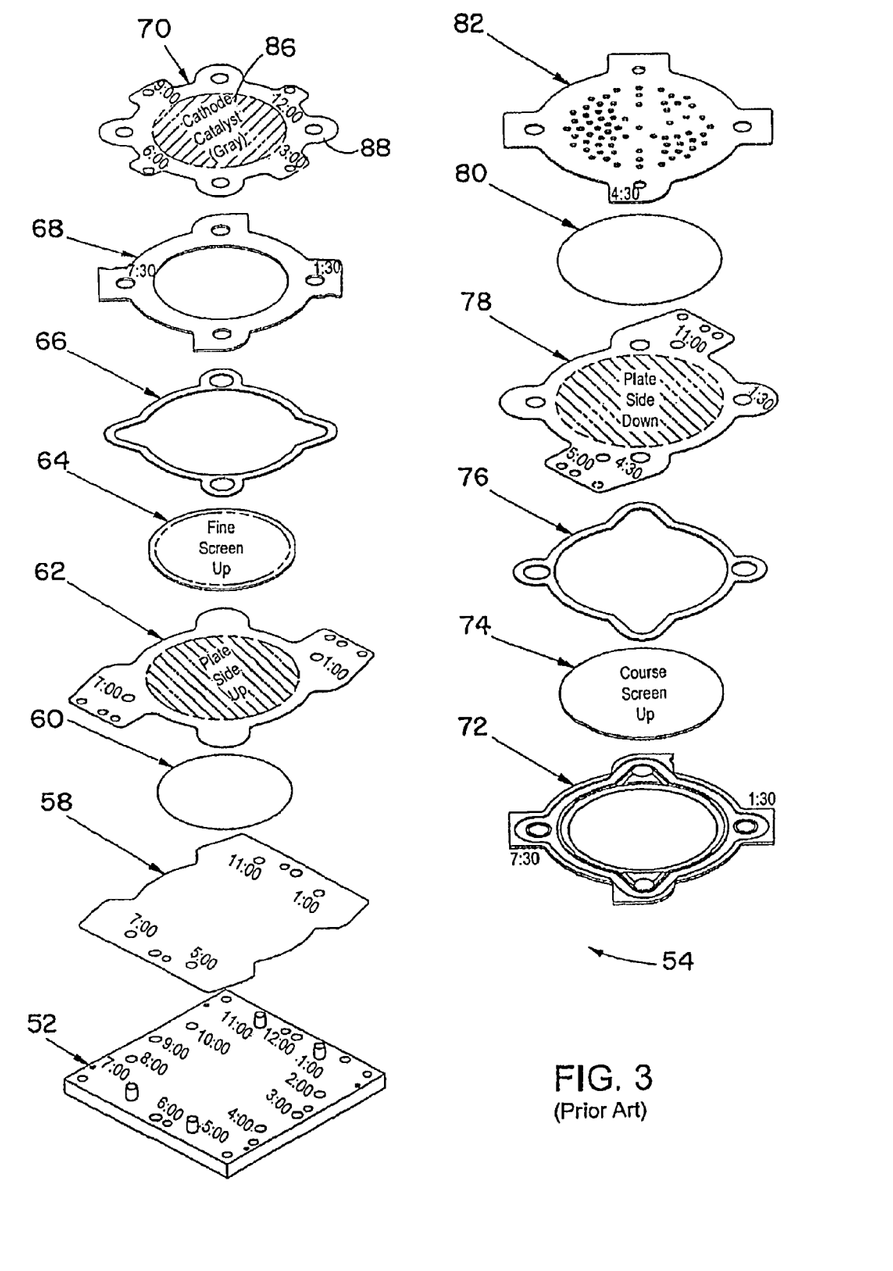
FIG. 3 is an exploded perspective view of a prior art electrolytic cell used in the assembly of FIG. 2.

The inventors also discovered that internal leaks arose from a poor seal just inside the hydrogen and/or oxygen ports in the prior art two-cell stack design that used a rigid gasket frame, which is shown in FIG. 3.

In order to resolve these problems and drawbacks, the inventors conceived of various design features that may be used individually or in combination with any one or more of the other features to provide a superior cell stack design that provides performance characteristic heretofore not attainable by prior art designs. The novel and inventive features include, among others:

(a) seating, as by molding, a screen, in particular a fine screen, into a plastic gasket frame in order to provide a flat surface for the ion-exchange membrane to sit on, thereby improving the seal around the ion-exchange membrane while minimizing or eliminating driving of a screen pack (or other flow field member) into the ion-exchange membrane;

(b) welding or otherwise securing a flow field member, in particular a coarse screen package, to the corresponding electrode plate, such as a titanium electrode plate, to reduce part count and aid in alignment;

(c) adding raised ridges, such as 0.03 inch ridges, to the plastic frame to improve sealing along the membrane perimeter and around the $O_2$ and $H_2$ ports;

(d) adding a small seal insert, such as a "trapezoidal" seal insert, to the frame for improving transmission of pressure through the stack radially inwardly of an adjacent port to aid in sealing at the ports; and/or (e) adding slots in the frame and corresponding tabs to the seals, or vice versa, to create a mechanical interlock between the frame and seal to ensure proper seating of the seals.

Again, any one of these features may be used with any one or more of the other features to obtain improved performance in a cell stack, particularly to enable cell stacks including one, two, three, four, five, six or more cells in a stacked arrangement, while affording desirable sealing performance without degradation of the cells.

Accordingly, the present invention provides an improved electrolytic cell. The electrolytic cell, in a preferred embodiment, employs a plastic molded frame component with raised ridges on one surface to create seal with a proton exchange membrane and on the opposite surface a groove with an interlocking feature for accepting a tabbed elastomeric gasket. The gasket and frame design when combined with a proton exchange membrane can be stacked in multiple layers using mechanical hardware. The frame captures the softer elastomeric sealing material preventing elastomeric creep and loss of positive seal caused by the relaxation of mechanical hardware under load and internal pressure fluctuations. The addition of the ridged sealing surface provides positive surface contact with the polymeric membrane to further prevent the loss of seal under mechanical load. The interlocking feature reduces assembly time and improves assembly accuracy.

Further features of the invention will become apparent from the following detailed description when considered in conjunction with the drawings.

BRIEF DESCRIPTION OF THE DRAWINGS

In the annexed drawings.

DETAILED DESCRIPTION

Figure 1:
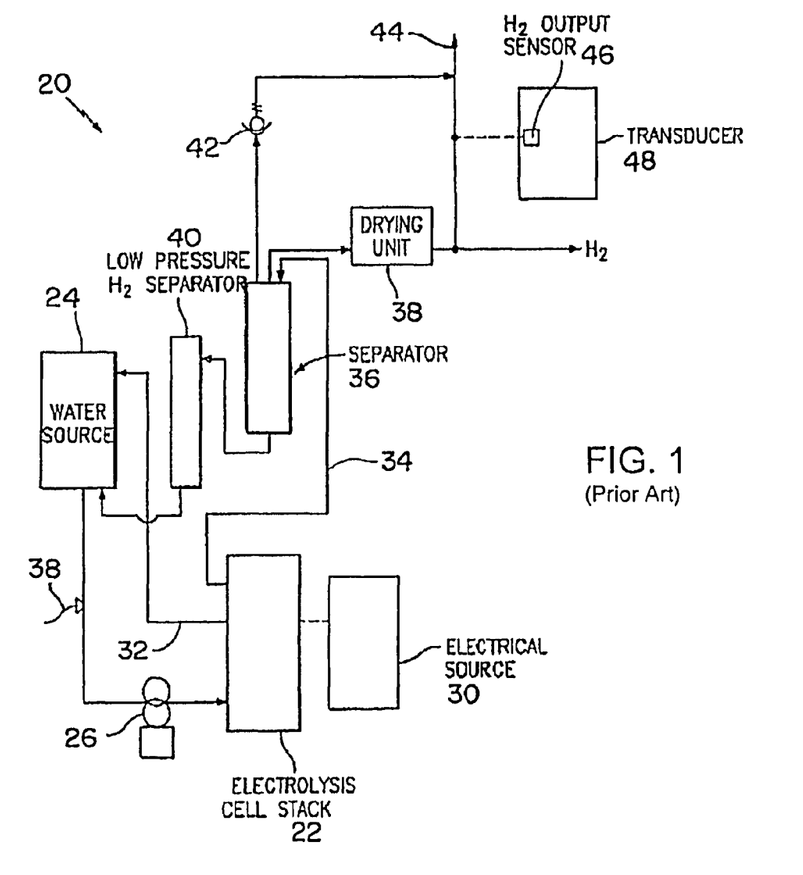
FIG. 1 is a diagrammatic illustration of a prior art electrolysis cell system in which hydrogen gas can be generated.

Referring now in detail to the drawings and initially to FIG. 1, an exemplary gas generator system is indicated generally by reference numeral 20. The illustrated system 20 is suitable for generating hydrogen for use as a fuel or for various other applications. While the improvements described below are described in relation to an electrolytic cell, the improvements are applicable to electrolytic cells, fuel cells, and the like. Furthermore, although the description and figures are directed to the production of hydrogen and oxygen gas by the electrolysis of water and will be described chiefly in this context, the apparatus is applicable to the generation of other gases from other reactant materials.

The system 20 includes a water-fed electrolytic cell stack 22 capable of generating hydrogen gas from reactant water. The reactant water utilized by system 20 is supplied from a water source 24 and is fed by gravity or pumped through a pump 26 into the electrolytic cell stack 22. The supply line may have an electrical conductivity sensor 28 disposed in fluid communication therewith to monitor the electrical potential of the water, thereby determining its purity and ensuring its adequacy for use in system 20.

The cell stack 22 comprises one or more cells that may be encapsulated within sealed structures, such as that shown in FIG. 2. The reactant water is received by manifolds or other types of conduits that are in fluid communication with the cell components. An electrical source 38 is disposed in electrical communication with each cell within cell stack 22 to provide a driving force for the dissociation of the water. The electrical source is operatively communicable with a cell control system (not shown) that controls the operation of system 20.

An oxygen-rich water stream exits the cell stack 22 and may fed back to the water supply via conduit 32. A hydrogen stream, which will normally be entrained with water, exits cell stack and is fed to a hydrogen/water separator 36 where the gas and liquid phases are separated.

The hydrogen gas exiting the separator 36 may be further dried in a drying unit 38, which may be, for example, a diffuser, a pressure swing absorber, desiccant or the like. This wet hydrogen stream can have a pressure of about 1 pound per square inch (psi) up to and exceeding about 20,000 psi. More particularly, the hydrogen stream pressure can be about 1 psi to about 10,000 psi, or from about 100 psi to about 6,000 psi, or from about 1,500 psi to about 2,500 psi, or a pressure of about 100 psi to about 275 psi for various applications. The hydrogen from drying unit may be fed to a storage facility, or directly to an application, e.g., a refueling system, for use as a fuel.

Water with trace amounts of hydrogen entrained therein may be returned to the water source 24 from the separator 36 through a low-pressure hydrogen separator 40. The separator 36 may have associated therewith a release 42, such as a relief valve, to rapidly purge hydrogen to a hydrogen vent 44 if the pressure or pressure differential exceeds a pre-selected limit.

In the illustrated system, a hydrogen output sensor 46 monitors the hydrogen pressure. The hydrogen output sensor is interfaced with a transducer 48, which is capable of converting the voltage or current value into a pressure reading. A display (not shown) may be disposed in operable communication with transducer to provide a reading of the pressure, for example, at the location of hydrogen output sensor on the hydrogen line.

Referring now to FIG. 2, a exemplary cell stack 22 can be seen to include a housing 50 including upper and lower housing structures 51 and 52 typically referred to as plates. The plates have stacked and clamped therebetween one or more electrolytic cells 54 according to the present invention. In the illustrated embodiment, water enters the cell housing 50 through a tee connection 55 connected to the housing by a stem, with the other end of the tee leading to a drain port. Water and oxygen are removed from the housing via an outlet 56, and water and hydrogen are removed via an outlet 57.

An exemplary prior art electrolytic cell 54 is shown in FIG. 3, with the normally stacked together components shown separated from one another. Going from one end of the cell to the opposite end, the illustrated cell includes the bottom plate 52, a heat transfer gasket 58, a second heat transfer gasket 60, an oxygen anode terminal plate 62, a membrane support assembly screen 64, an anode-side gasket seal (or sealing gasket) 66, a rigid oxygen gasket frame 68, an electrode and membrane assembly 70, a rigid hydrogen gasket frame 72, a membrane support assembly screen 74, a cathode-side gasket seal (or sealing gasket) 76, a hydrogen cathode terminal plate 78, a pressure pad 80, and a top gasket 82 that interfaces with the top plate 51 or another cell stack. The references to top, upper, bottom, lower, etc. are being used in relation to the illustrated orientation of the cell 54 or other components, but this should not viewed as limiting since the cell and/or other components can be otherwise oriented as may be desired for a particular application. Thus, the herein referred to bottom plate may be disposed at the top, side or otherwise depending on the orientation of the cell.

The illustrated membrane assembly 70 includes a solid polymeric ion-exchange membrane 86 that is bounded by a carrier or gasket portion 88. The membrane 86 is disposed between the anode and cathode terminal plates 62 and 78 and in electrical contact therewith via the anode and cathode screens 64 and 74.

The gaskets and associated seals are provided to insure a water-tight (or more generally fluid-tight) construction for the electrolytic cell. In addition, the gaskets 58 and 60 are provided between the anode and the bottom plate 52 of the housing to electrically insulate the anode from the base of the housing. These gaskets should also have sufficient thermal conductivity to ensure good heat transfer from the electrodes to the housing, which serves as a heat sink. The housing in turn may be fastened to a metal chassis which then would also become part of the heat sink.

The pressure disk 80 is provided to ensure that the screens 64 and 74 firmly engage the respective electrodes as well as the solid-electrolyte membrane 107. The pressure disk 80 has essentially the same diameter as the screens and may be disposed, as shown, between the cathode terminal plate 78 and the uppermost gasket 82 so that when the two housing sections are drawn together, the disc 80 exerts pressure on the screens.

The electrolytic cell 54 as thus far described generally is of a conventional design. Consequently, further details of the construction and operation of the cell 54 need not be described except as needed to facilitate an understanding of the invention, the features of which will not be described in greater detail.

The foregoing cell arrangement works well for stacks with one or two cell layers. When more than two cell layers are used, pressure leakage problems have been found to occur, such as hydrogen leaking into the oxygen and outboard gas leakage to the atmosphere. In a prior art four layer cell stack using cells similar to the single cell shown in FIG. 2 of U.S. Pat. No. 5,037,518, the oxygen and hydrogen gaskets (gaskets 106 and 109 in U.S. Pat. No. 5,037,518 were replaced with gaskets made from an elastomeric material. This design has performed acceptably, but over time the elastomeric gaskets "relax". This relaxation can cause the cell stack to leak outboard and/or hydrogen to leak into the oxygen. The relaxation may also cause the screens to be driven into the ion-exchange membranes and this can lead to holes or tears.

The inventors also discovered that internal leaks arose from a poor seal just inside the hydrogen and/or oxygen ports in the prior art two-cell stack design that did use a rigid frame.

In order to resolve these problems and drawbacks, the inventors conceived of various design features that may be used individually or in combination with any one or more of the other features to provide a superior cell stack design that provides performance characteristics heretofore not attainable by prior art designs. The novel and inventive features include, among others:

seating, as by molding, a screen, in particular a fine screen, into a plastic gasket frame in order to provide a flat surface for the ion-exchange membrane to sit on, thereby improving the seal around the ion-exchange membrane while minimizing or eliminating driving of a screen pack (or other flow field member) into the ion-exchange membrane;

welding or otherwise securing a flow field member, in particular a coarse screen package, to the corresponding electrode plate, such as a titanium electrode plate, to reduce part count and aid in alignment;

adding raised ridges, such as 0.03 inch ridges, to the plastic frame to improve sealing along the membrane perimeter and around the $O_2$ and $H_2$ ports;

adding a small seal insert, such as a "trapezoidal" seal insert, to the frame for improving transmission of pressure through the stack radially inwardly of an adjacent port to aid in sealing at the ports; and/or adding slots in the frame and corresponding tabs to the seals, or vice versa, to create a mechanical interlock between the frame and seal to ensure proper seating of the seals.

Again, any one of these features may be used with any one or more of the other features to obtain improved performance in a cell stack, particularly to enable cell stacks including one, two, three, four, five, six or more cells in a stacked arrangement, while affording desirable sealing performance without degradation of the cells.

Figure 4:
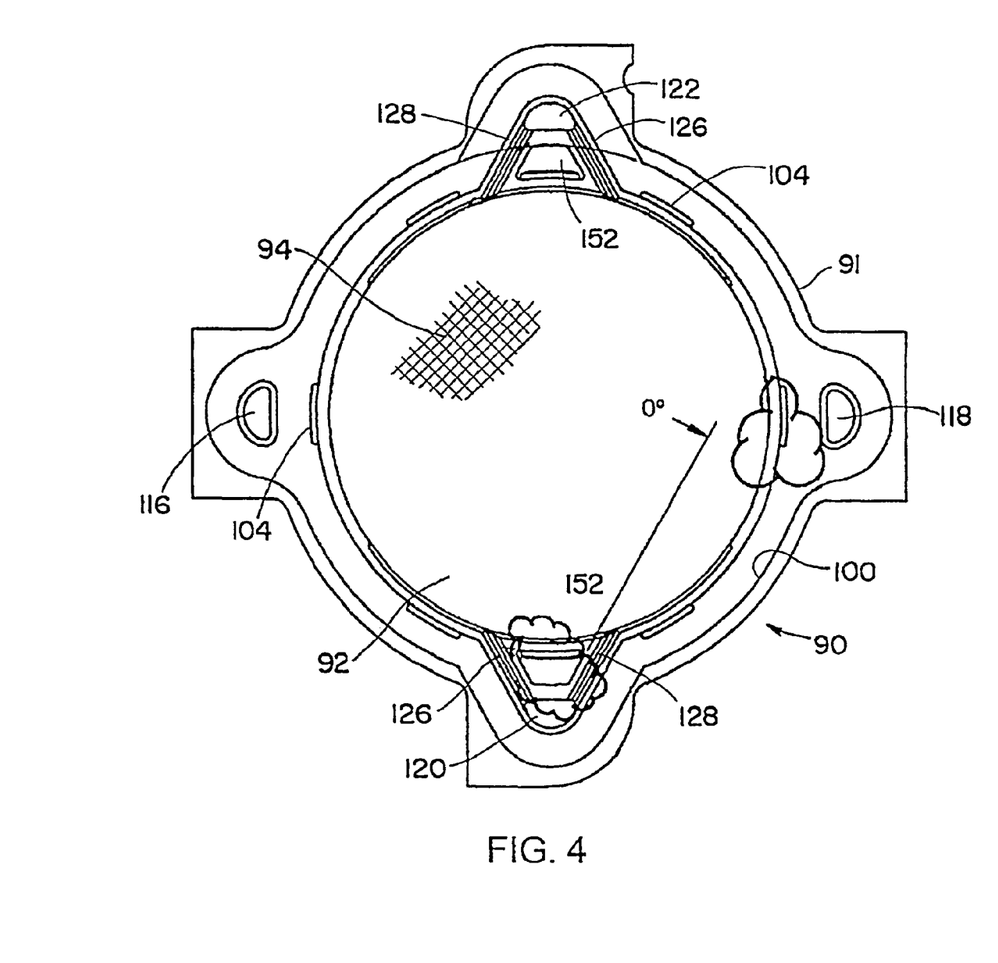
FIG. 4 is a top plan view of a rigid hydrogen gasket frame according to the invention.
Figure 5:
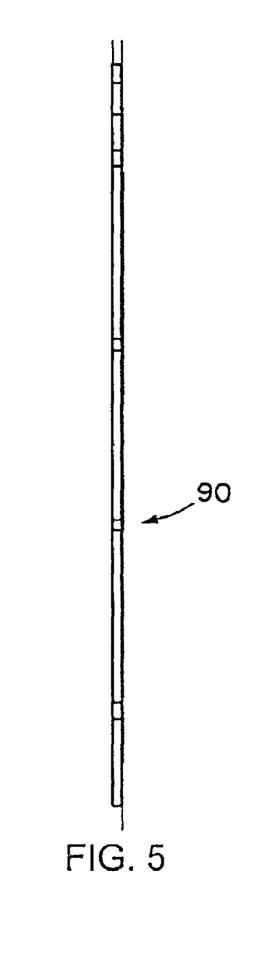
FIG. 5 is an edge view of the rigid hydrogen gasket frame of FIG. 4.
Figure 6:
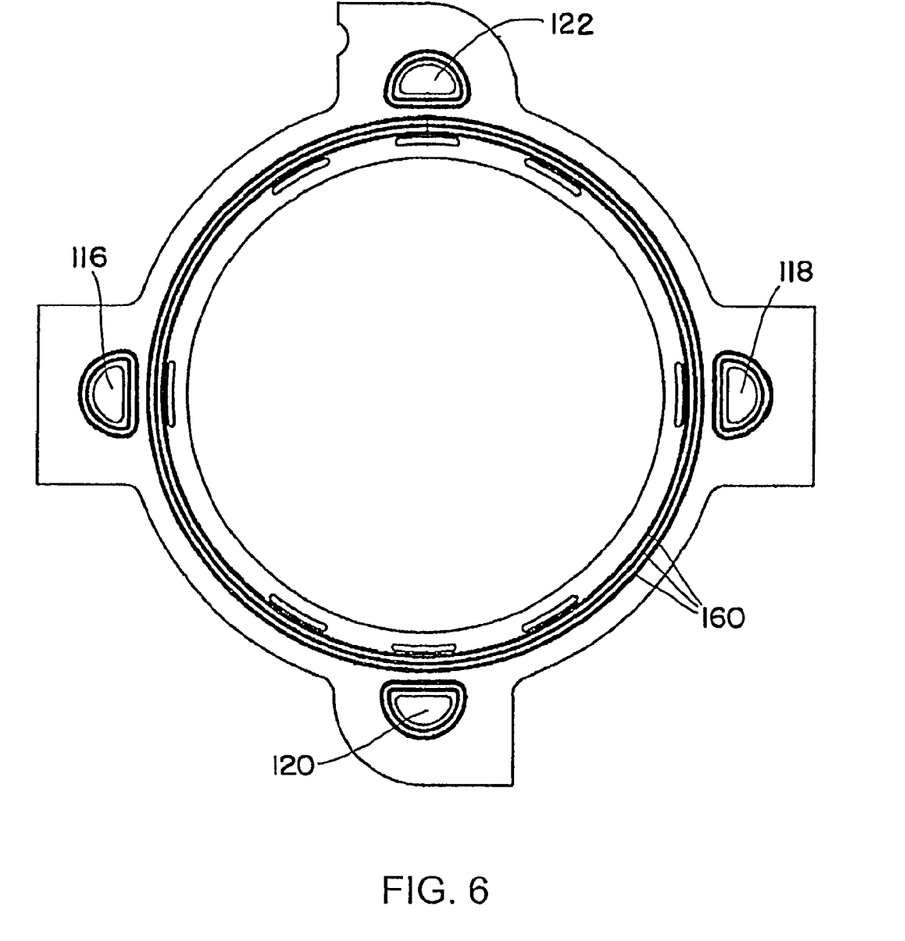
FIG. 6 is a bottom plan view of the rigid hydrogen gasket frame of FIG. 4.
Figure 7:
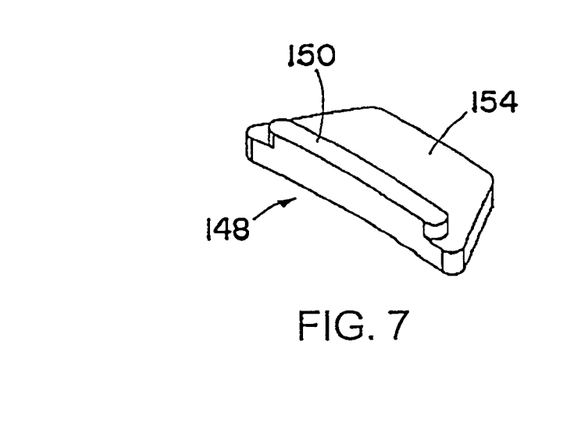
FIG. 7 is a perspective view of a seal insert according to the present invention.
Figure 8:
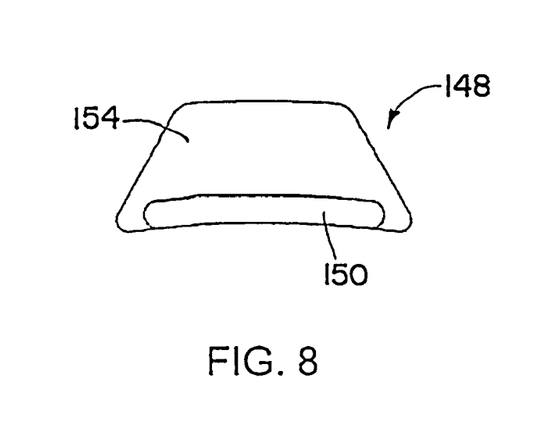
FIG. 8 is a plan view of the seal insert of FIG. 7.
Figure 9:
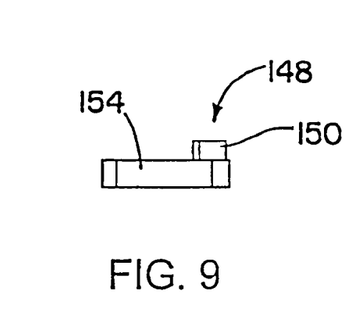
FIG. 9 is an end view of the seal insert of FIG. 7.
Figure 10:
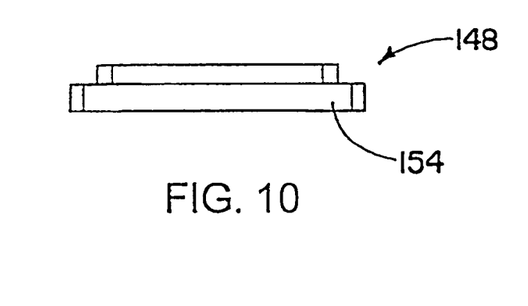
FIG. 10 is an elevational view of the seal insert of FIG. 7.
Figures 11, 12:
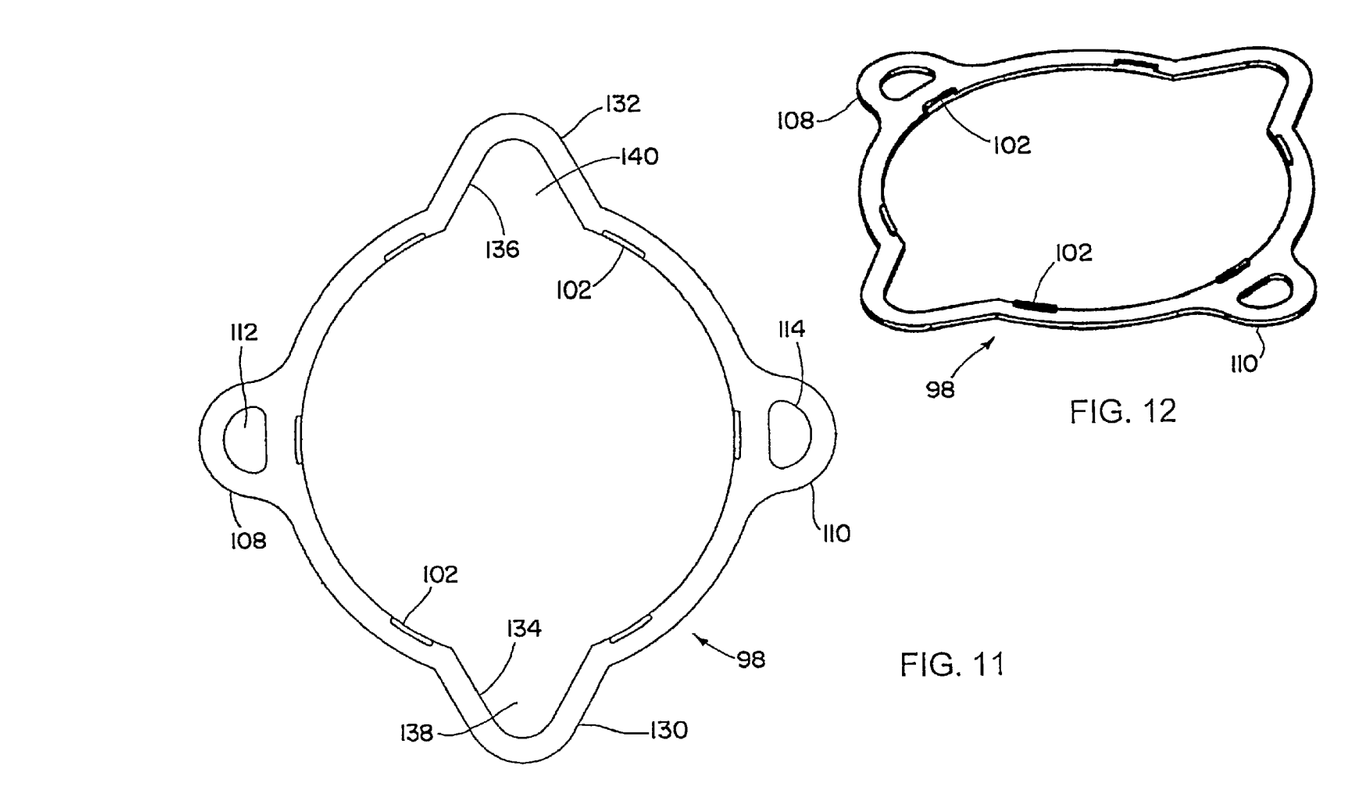
FIG. 11 is a plan view of a hydrogen sealing gasket according to the invention.
FIG. 12 is a perspective view of the hydrogen gasket seal of FIG. 11.

Referring now to FIGS. 4-6, an exemplary rigid gasket frame according to the invention, herein also referred to as a planar frame component, is indicated generally by reference numeral 90. The frame 90 can be configured for use as the rigid oxygen (anode) gasket frame 68 or the rigid hydrogen (cathode) gasket frame 72.

The frame 90 has a frame body 91 that bounds and supports the flat ion-exchange membrane. The frame body 91 surrounds a central through opening 92 that defines a flow field region adjacent a respective side of the ion-exchange membrane 86 and in fluid communication with the respective electrode plate (anode 62 or cathode 78). The frame 90 and central opening 92 may be of any suitable configuration. In the illustrated embodiment the frame is generally circular and the opening is circular. Those skilled in the art will appreciate that other shapes may be used, such as rectangular, square or other polygonal shape, or other non-circular shapes.

The frame 90 retains therein a screen 94. In a preferred embodiment, the screen is molded into the frame that preferably is made of plastic. That is, the frame is molded to the peripheral edge portion of the screen to form a unitary structure. As above noted, the screen may be a fine mesh screen that provides a flat surface for the ion-exchange membrane to sit on, thereby improving the seal around the ion-exchange membrane while minimizing or eliminating driving of a screen pack (or other flow field member) into the ion-exchange membrane.

The screen 94 may be formed as part of a flow field member or provided in addition to the flow field member. The flow field member may be, for example, a conventional fine or coarse screen package, such as the package 64/74 shown in FIG. 3. As above indicated, this package or other flow field member may be welded to the adjacent electrode plate 62/78, such as a titanium electrode plate, to reduce part count and aid in alignment. The screen package or other flow field member allows fluid to flow therethrough for carrying out the electrolytic reaction. The flow field member may be a screen pack, bipolar plate, porous plate, gas diffusion member, for example. In the illustrated embodiment, the flow field member is a screen or screen pack, and the reference to a screen pack herein is intended to mean a screen, screen pack or any other type of flow field member unless expressly indicated otherwise to the contrary. With reference to FIG. 3, the screen pack may be the screen 64 or screen 74 depending on which side of the ion-exchange membrane the frame 90 is located. The radially inner portion of the frame that borders the central opening 92 may be recessed to form a pocket 95 for closely receiving and locating the peripheral edge of the screen pack, with the fine mesh screen forming a bottom of this recessed area as best illustrated in FIGS. 13-15.

Figure 13:
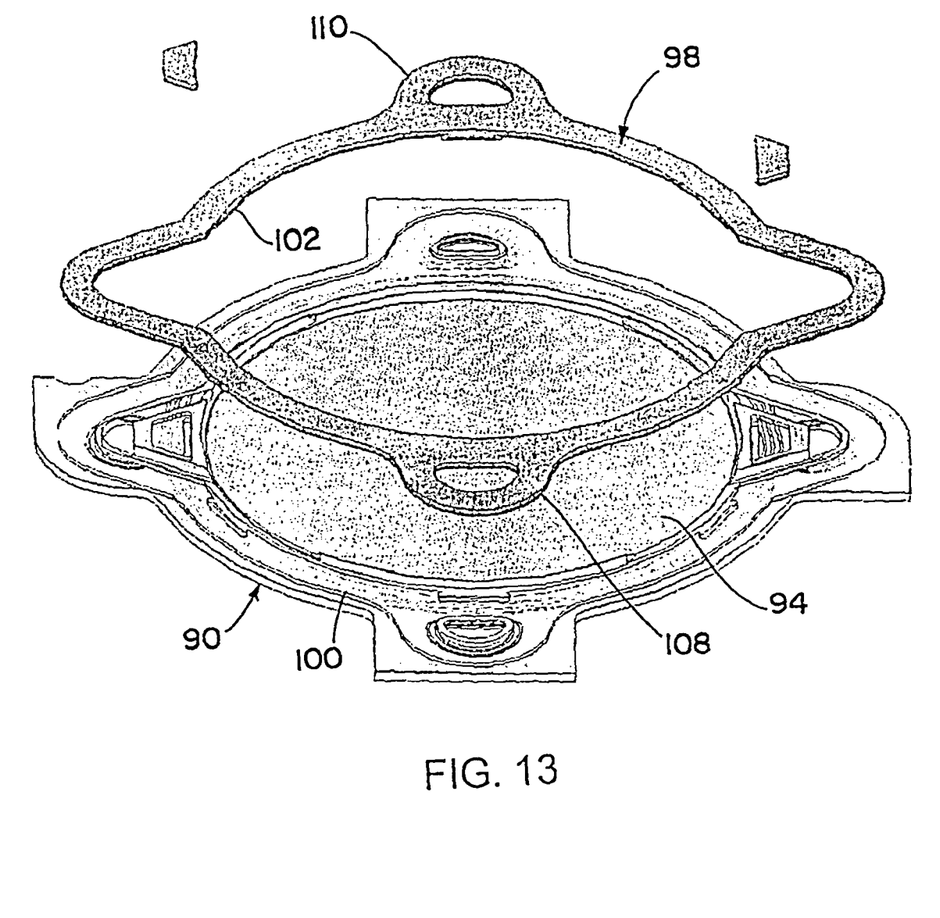
FIG. 13 is an exploded perspective view illustrating assembly of the hydrogen gasket seal and seal insert to the hydrogen gasket frame.
Figure 14:
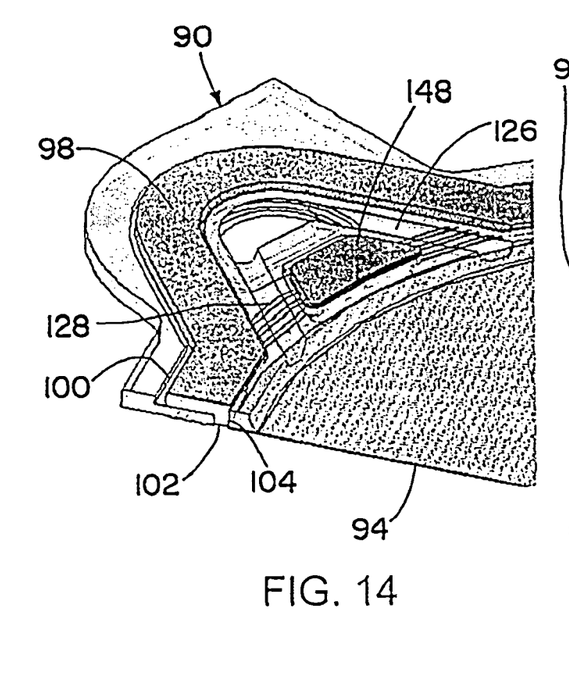
FIG. 14 is a fragmentary perspective view, partly broken away in section, showing the hydrogen gasket seal and seal insert assembled to the hydrogen gasket frame.
Figure 15:
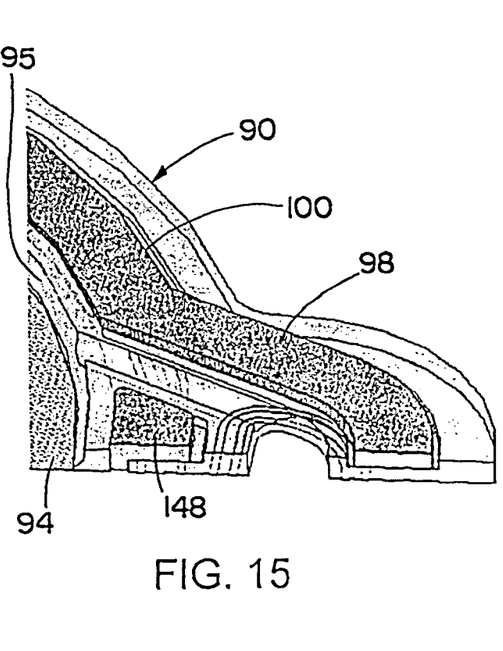
FIG. 15 is another fragmentary perspective view, partly broken away in section, showing the hydrogen gasket seal and seal insert assembled to the hydrogen gasket frame.

In addition to radially locating the screen 94, the frame 90 preferably also functions to radially locate a gasket seal 98 as depicted in FIGS. 13-15. To this end, the side face of the frame 90 opposite the ion-exchange membrane has formed therein an annular groove 100 for receiving and locating the gasket seal 98 that preferably has a corresponding shape. The gasket seal 90 may be either the anode-side gasket seal 66 of FIG. 1 or the cathode-side gasket seal 76, depending on which side of the ion-exchange member the frame 90 is located (whether it forms the rigid frame 68 or rigid frame 72).

In a preferred embodiment, the frame 90 and gasket seal 98 have respective integral interlocking features that cooperate with one another for fixedly locating the gasket seal relative to the frame. In the illustrated exemplary embodiment seen in FIGS. 4, 6, 11 and 12, the gasket seal 98 may have one or more axially extending locating tabs 102 forming the interlocking feature thereof that are received in respective locating slots 104 in the frame 90 that form the interlocking feature of the frame. In the illustrated gasket seal, a series of projecting tabs are circumferentially spaced-apart around the inner periphery of the gasket seal and the slots are openings that are correspondingly spaced-apart around the inner periphery of the frame 90. As best seen in FIG. 4, the slots may open radially inwardly to the screen-receiving recess 95 in the frame plate 90.

The gasket seal 90 forms a peripheral seal that surrounds the flow field region to prevent escape of fluid to the atmosphere. The gasket seal further has portions thereof configured to seal around one or more port openings in the frame 90 that are not intended to communicate with the flow field region. With reference to FIGS. 4 and 11-15, the gasket seal has diametrically opposed lobe portions 108 and 110 provided with respective openings 112 and 114 that align with respective port openings 116 and 118 in the frame plate 90, as well in the cell components between which the frame plate is sandwiched, these being the ion-exchange membrane assembly 70 on one side and the anode/cathode electrode plate 62/78 on the opposite side in the case of the cell stack shown in FIG. 3. If the gasket seal 76 is the cathode gasket seal in the water-fed electrolytic cell stack 22 (FIG. 3) capable of generating hydrogen gas from reactant water, the port openings 116 and 118 will provide for flow of supply water and oxygen-rich water into and out of the cell.

The frame plate 90 also has one or more port openings 120 and 122 that are intended to communicate with the hydrogen flow field region. These port openings are the port openings through which hydrogen gas is discharged from the flow field region. In the regions of these port openings, the gasket seal 98 extends only around the exterior of these openings. Moreover, the frame plate has at each port one or more generally radially extending grooves 126 and 128 for fluidly connecting the flow field region to respective port openings. In the illustrated embodiment, the gasket seal has diametrically opposite lobes 130 and 132 that have interior recesses 134 and 136 extending between the flow field region and the port openings. As shown, the recesses may be generally triangular or trapezoidal in shape, and the frame plate may have two circumferentially spaced apart grooves in the membrane side face thereof that from therebetween an acute angle and which generally form respective sides of a respective trapezoidal region 138, 140 that has the other two sides coinciding with the port opening and the central opening in the frame.

As above mentioned, the inventors discovered that internal leaks arose from a poor seal just inside the hydrogen and/or oxygen ports in the prior art two-cell stack design that used a rigid frame, which would be compounded as the number of cell layers is increased. The inventors discovered that this problem can be surprisingly resolved by the provision of a sealing insert 148 in the frame. The sealing insert is located between the respective port and the central opening in the region of the flow passage or passages connecting the flow field region to the port. In the illustrated embodiment using converging recesses, the seal insert has a trapezoidal shape as seen in FIGS. 7-10.

In order to insure proper locating and retention of the seal inserts, each seal insert 148 is provided with a tab portion 150 that fits in a correspondingly shaped slot 152 in the frame. The tab portion projects from a main body portion 154, the thickness of which is selected preferably to provide a facing surface essentially flush with the surface of the gasket seal for engaging along with the gasket seal a planar surface of the adjacent electrode plate. The sealing insert may be made of any suitable material, such as for example the same elastomeric material as the gasket seal whereby the sealing insert and gasket seal will have similar compression characteristics in the cell stack. In this latter regard, the generally planar body of the seal insert may have a thickness essentially equal the thickness of the gasket seal.

Thus, the sealing insert 148 provides backing for the frame 90 in the region of the flow passages 126 and 128, thereby to insure a tight seal between the frame and the peripheral sealing portion of the ion-exchange membrane assembly. Additionally or alternatively, the side surface of the frame facing the ion-exchange membrane assembly may be provided with one or more annular ridges 160 to improve sealing around the membrane perimeter and around the $O_2$ and $H_2$ ports. The ridge or ridges 160 may have an axial thickness of 0.03 inch, for example. The ridges may be radially spaced apart, such as concentrically. Although three ridges are shown, the number may be varied as desired.

Although the invention has been illustrated with only one electrolytic cell, i.e., one pair of electrodes and one ion-exchange membrane, it will be understood that two, three, four, five, six or more cells may be stacked on top of each other in a single housing in order to increase the hydrogen-producing capacity of the unit.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An ion-exchange membrane cell stack subassembly comprising:
    an ion-exchange membrane;
    a planar frame component having a frame body bounding the ion-exchange membrane at a through opening coinciding with a flow field region;
    a port in the planar frame component for axial flow of fluid through the planar frame component;
    a planar elastomeric gasket seal for sealing the planar frame component to an adjacent planar component on a side opposite the ion-exchange membrane, the planar elastomeric gasket seal having at least one lobe that has an interior recess extending radially between the flow field region and the port for providing fluid communication between the flow field region and the port within the interior recess; and
    a screen retained by molding in the planar frame component that provides a flat surface for supporting the ion-exchange membrane; and wherein a seal insert is fitted to the planar frame component for improving transmission of pressure through the stack radially inwardly of the port in the planar frame component, and wherein the seal insert is disposed within the interior recess and circumferentially spaced from adjacent walls of the lobe that define the interior recess to form within the interior recess on respective circumferential sides of the seal insert a pair of radial flow passages that effect communication between the port and a side of the ion-exchange membrane interiorly of the frame component.

2. The ion-exchange membrane cell stack subassembly of claim 1, wherein the screen is made of plastic.

3. The ion-exchange membrane cell stack subassembly of claim 1, comprising a flow field member secured to an electrode plate stacked adjacent the planar frame component.

4. The ion-exchange membrane cell stack subassembly of claim 1, wherein one or more raised annular ridges are provided on the surface of the planar frame component that faces the ion-exchange membrane to improve sealing around the membrane perimeter.

5. The ion-exchange membrane cell stack subassembly of claim 1, wherein the seal insert and planar frame component have a corresponding tab and slot for locating the seal insert with respect to the planar frame component.

6. The ion-exchange membrane cell stack subassembly of claim 1, wherein the planar frame component has grooves formed on opposite sides of the seal insert for providing fluid communication between a central through opening in the planar frame component and a fluid port provided in the planar frame component radially outwardly of the central through opening.

7. The ion-exchange membrane cell stack subassembly of claim 1, wherein slots in the planar frame and corresponding tabs in the planar elastomeric gasket seal, or vice versa, are provided to create a mechanical interlock between the frame and the planar elastomeric gasket seal to ensure proper seating of the planar elastomeric gasket seal.

8. An ion-exchange membrane cell stack subassembly, comprising:
 a planar frame component having a frame body bounding and supporting a flat membrane around a flow field region, with at least one raised ridge on one surface of the frame surrounding the membrane and a groove on an opposite surface of the frame surrounding the membrane, and an integral interlocking feature on the frame, wherein the membrane spans an opening centrally disposed in the frame, the groove circumferentially surrounds the opening in the frame, and the at least one raised ridge is spaced inwardly from an outer peripheral edge of the planar frame;
 a port in the planar frame component for axial flow of fluid through the planar frame component;
 a planar elastomeric gasket having a continuous configuration substantially matching the configuration of the groove, and located within the groove, the planar elastomeric gasket including an integral interlocking feature cooperating with the interlocking feature in the frame for fixedly locating the planar elastomeric gasket relative to the frame;
 wherein the interlocking feature on the frame comprises a series of openings spaced apart around the groove; and the interlocking feature on the planar elastomeric gasket comprises a series of projecting tabs each having a configuration received within a respective groove opening, and
 wherein the planar elastomeric gasket has at least one lobe that has an interior recess extending radially between the flow field region and the port for providing fluid communication between the flow field region and the ort within the interior recess;
 wherein a seal insert is fitted to the planar frame component for improving transmission of pressure through the stack radially inwardly of the port in the planar frame component, the seal insert is disposed within the interior recess and circumferentially spaced from adjacent walls of the lobe that define the interior recess to form within the interior recess on respective circumferential sides of the seal insert pair of radial flow passages that effect communication between the port and a side of the ion-exchange membrane interiorly of the frame component.

9. An ion-exchange membrane cell stack comprising one or more electrolytic cells each including the ion-exchange membrane cell stack subassembly according to claim 8.

10. An ion-exchange membrane cell stack according to claim 9, wherein the one or more electrolytic cells are sandwiched between first and second housing members.

11. An ion-exchange membrane cell stack according to claim 9, wherein each electrolytic cell includes any one or any combination of one or more of the following additional components stacked in relation to a respective ion-exchange membrane cell stack subassembly: a heat transfer gasket, an anode terminal plate, a membrane support assembly screen, a cathode terminal plate, and/or a pressure pad.

12. The ion-exchange membrane cell stack subassembly of claim 1, wherein the seal insert has a trapezoidal shape.

13. The ion-exchange membrane cell stack subassembly of claim 8, wherein the seal insert and planar frame component have a corresponding tab and slot for locating the seal insert with respect to the planar frame component.

14. The ion-exchange membrane cell stack subassembly of claim 8, wherein the planar frame component has grooves formed on opposite sides of the seal insert for providing fluid communication between a central through opening in the planar frame component and a fluid port provided in the planar frame component radially outwardly of the central through opening.

* * * * *